US012344086B2

United States Patent
Azzouz et al.

(10) Patent No.: US 12,344,086 B2
(45) Date of Patent: Jul. 1, 2025

(54) COOLING MODULE FOR A MOTOR VEHICLE COMPRISING A TANGENTIAL FLOW TURBOMACHINE

(71) Applicant: Valeo Systemes Thermiques, Le Mesnil Saint-Denis (FR)

(72) Inventors: Kamel Azzouz, Le Mesnil Saint Denis (FR); Sébastien Garnier, Le Mesnil Saint Denis (FR); Amrid Mammeri, Le Mesnil Saint Denis (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 421 days.

(21) Appl. No.: 17/641,578

(22) PCT Filed: Sep. 8, 2020

(86) PCT No.: PCT/FR2020/051545
§ 371 (c)(1),
(2) Date: Mar. 9, 2022

(87) PCT Pub. No.: WO2021/048493
PCT Pub. Date: Mar. 18, 2021

(65) Prior Publication Data
US 2022/0297532 A1 Sep. 22, 2022

(30) Foreign Application Priority Data
Sep. 10, 2019 (FR) ...................... 1909951

(51) Int. Cl.
*B60K 11/08* (2006.01)
*B60K 11/06* (2006.01)
*F01P 11/10* (2006.01)

(52) U.S. Cl.
CPC ............ *B60K 11/085* (2013.01); *B60K 11/06* (2013.01); *F01P 11/10* (2013.01)

(58) Field of Classification Search
CPC ....... B60K 11/085; B60K 11/06; B60K 11/08; F01P 11/10
See application file for complete search history.

(56) References Cited

U.S. PATENT DOCUMENTS

| 4,519,343 A | * | 5/1985 | Hayashi | ................... F01P 5/06 123/41.65 |
| 7,931,104 B2 | * | 4/2011 | Frelich | .................. B60K 11/02 180/68.1 |
| 9,168,828 B2 | * | 10/2015 | Bourqui | ............... B60K 11/085 |
| 10,100,707 B2 | * | 10/2018 | Wolf | .................... B60K 11/085 |

(Continued)

FOREIGN PATENT DOCUMENTS

| CN | 105008165 A | 10/2015 |
| CN | 105555574 A | 5/2016 |

(Continued)

OTHER PUBLICATIONS

Office Action issued in counterpart Chinese application No. 202080071539.X, dated Oct. 20, 2023 (7 pages).

(Continued)

*Primary Examiner* — James A Shriver, II
*Assistant Examiner* — Nicholas R. Kandas
(74) *Attorney, Agent, or Firm* — Osha Bergman Watanabe & Burton LLP

(57) ABSTRACT

A ventilation device (24) for a cooling module (22) of a motor vehicle (10) comprises a tangential flow turbomachine (28-1; 28-2) with an impeller wheel (32-1; 32-2), a frame (30) forming a recess (30-1; 30-2) for receiving the impeller wheel (32-1; 32-2), flaps (52-1; 52-2) which pivot relative to the frame (30), the flaps (52-1; 52-2) being suitable for selectively closing off an opening (51-1; 51-2) through the frame (30). An actuator (54-1; 54-2) for controlling the pivoting of the flaps (52-1; 52-2) comprises an electric motor (56-1; 56-2), the output shaft of which rotates one of the flaps (52-1; 52-2) and a rod (58-1) connecting one (Continued)

flap (52-1; 52-2) to the other flaps (52-1; 52-2), such that the rotation of one flap (52-1; 52-2) is transmitted to the other flaps (52-1; 52-2).

10 Claims, 7 Drawing Sheets

(56) References Cited

U.S. PATENT DOCUMENTS

| | | | |
|---|---|---|---|
| 2005/0023057 A1 | | 2/2005 | Maeda et al. |
| 2013/0068403 A1* | | 3/2013 | Fenchak .............. B60K 11/085 160/218 |
| 2013/0101408 A1 | | 4/2013 | Shiraichi et al. |
| 2018/0009313 A1 | | 1/2018 | Watanabe et al. |

FOREIGN PATENT DOCUMENTS

| | | | |
|---|---|---|---|
| CN | 107128164 A | | 9/2017 |
| DE | 102008020310 A1 | | 10/2009 |
| DE | 102017203858 A1 | | 9/2018 |
| DE | 102017119098 A1 | * | 2/2019 |
| EP | 2402574 A1 | | 1/2012 |
| FR | 3078572 A1 | | 9/2019 |

OTHER PUBLICATIONS

International Search Report and Written Opinion in corresponding International Application No. PCT/FR2020/051545, mailed Nov. 9, 2020 (12 pages).

* cited by examiner

COOLING MODULE FOR A MOTOR VEHICLE COMPRISING A TANGENTIAL FLOW TURBOMACHINE

TECHNICAL FIELD

The invention concerns a cooling module for a motor vehicle, comprising a tangential-flow turbomachine. The invention also concerns a motor vehicle equipped with such a cooling module.

PRIOR ART

Motor vehicles, whether of the combustion-engine or electric-motor type, have to discharge the heat generated by their operation, and are equipped with heat exchangers for this purpose. A motor vehicle heat exchanger generally comprises tubes, in which a heat transfer fluid, in particular a liquid such as water, is intended to circulate, and heat exchange elements connected to these tubes, often designated by the term "fins". The fins are used to increase the surface area for exchange between the tubes and the ambient air.

However, in order to further increase the heat exchange between the heat transfer fluid and the ambient air, a ventilation device is often used in addition, to generate or increase a flow of air directed toward the tubes and the fins.

As is known, such a ventilation device comprises a blower-wheel fan.

The flow of air generated by the blades of such a fan is turbulent, in particular because of the circular geometry of the blower wheel, and generally reaches only part of the surface of the heat exchanger (the circular region of the exchanger that faces the blower wheel of the fan). The exchange of heat is therefore not uniform across the entire surface of the tubes and of the fins.

Furthermore, when it is not necessary for the fan to be switched on (typically when the exchange of heat with non-accelerated ambient air is sufficient to cool the heat transfer fluid circulating in the exchanger), the blades partially obstruct the flow of the ambient air toward the tubes and the fins, thus impeding the circulation of air toward the exchanger and thus limiting the exchange of heat with the heat transfer fluid.

Such a fan is also relatively bulky, in particular because of the dimensions of the blower wheel that are necessary in order to obtain effective engine cooling, and this makes incorporating it into a motor vehicle a lengthy and difficult process.

The object of the invention is to at least partially overcome these drawbacks.

DISCLOSURE OF THE INVENTION

Accordingly, the subject of the invention is a ventilation device for a cooling module for a motor vehicle, comprising:
- at least one tangential-flow turbomachine comprising a bladed wheel and a motor for driving the rotation of the bladed wheel,
- at least one frame forming a receiving housing able to accommodate the bladed wheel,
- a plurality of shutters mounted with the ability to pivot with respect to the frame, the plurality of shutters being designed to selectively block off an opening through the frame, and
- an actuator to bring about the pivoting of the plurality of shutters, said actuator comprising:
- an electric motor of which the output shaft drives the rotation of one of the plurality of shutters;
- at least one connecting rod connecting said one shutter to the other shutter(s) of the plurality of shutters, so that the rotation of said one shutter is transmitted to the other shutter(s).

Thus, advantageously, use is made of at least one tangential-flow turbomachine able to achieve an air flow that is better distributed over one or more exchangers of rectangular overall shape.

Furthermore, the presence of shutters that allow an opening in the frame to be selectively blocked off makes it possible to increase the flow of air passing through the heat exchanger(s) when the turbomachine(s) are switched off and the air flow is created by the speed of the moving vehicle.

Finally, the actuator described hereinabove is simple to produce and particularly robust. It allows synchronized control of the rotation of the shutters.

As a preference, the cooling module comprises one or more of the following features, considered alone or in combination:
- each shutter has, at a first end, a cam, the cams of the shutters being connected to one another by said at least one connecting rod;
- each shutter has, at a second end, a spigot housed with the ability to pivot in a receiving housing in the frame;
- the shutters are tubular, the shutters having a substantially planar face and a curved opposite face, the substantially planar faces of the shutters being intended to be aligned in the position in which the shutters block off the opening through the frame;
- the shutters have a longitudinal rib on a first longitudinal side and a longitudinal groove on a second longitudinal side, the groove and the rib having complementing shapes;
- in the position in which the opening is blocked off by the shutters, the shutters form a substantially planar surface which, with an air inlet surface normal to the air flow entering the ventilation device, forms an angle of between 5 and 20°, preferably substantially equal to 12.5°;
- the shutters are configured to be able to pivot through an angular range of amplitude of between 90° and 110°, preferably of amplitude equal to 102.5°; and
- each shutter has a seal, notably overmolded on the shutter;
- the ventilation device further comprises a grille at an air outlet formed by the frame.

Another aspect describes a cooling module for a motor vehicle, particularly for a motor vehicle with an electric motor, comprising at least one heat exchanger and at least one ventilation device as described hereinabove in all combinations thereof and able to create a flow of air in contact with the at least one heat exchanger.

Another aspect proposes a motor vehicle comprising a body and a cooling module as described hereinabove, the body defining at least one cooling opening, the cooling module being arranged opposite the at least one cooling opening.

BRIEF DESCRIPTION OF THE DRAWINGS

Other features, details and advantages of the invention will become apparent upon reading the detailed description below, and upon analyzing the appended drawings, in which.

DESCRIPTION OF EMBODIMENTS

In the remainder of the description, elements that are identical or perform identical functions have been designated with the same reference sign. In the present description, for the sake of conciseness, these elements are not described in detail in each embodiment. Rather, only the differences between the variant embodiments are described in detail.

Figure 1:
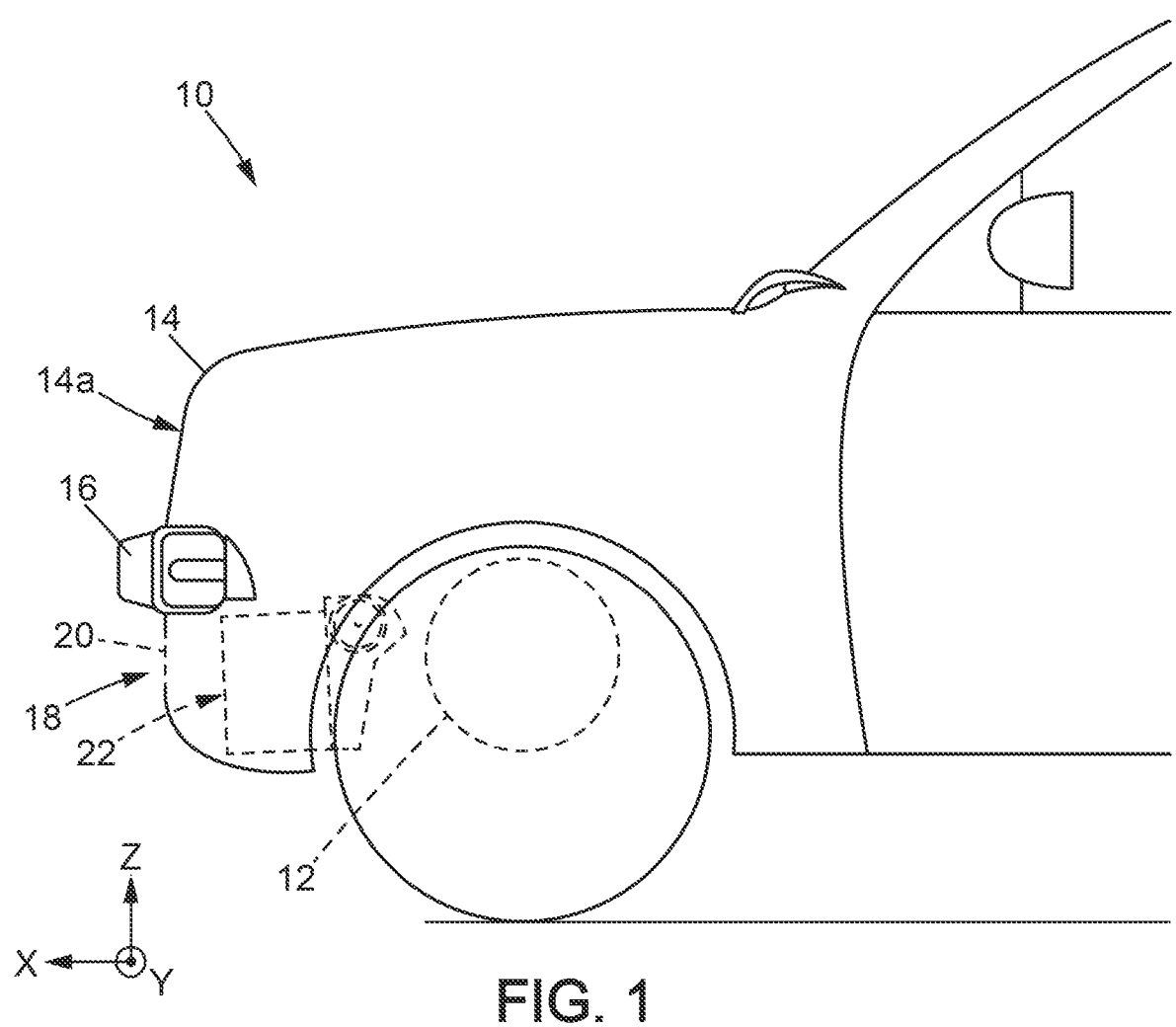
FIG. 1 schematically depicts the front part of a motor vehicle, viewed from the side.

FIG. 1 schematically illustrates the front part of a motor vehicle 10 with a motor 12. The vehicle 10 comprises in particular a body 14 and a bumper 16 that are carried by a chassis (not shown) of the motor vehicle 10. The body 14 defines a cooling opening 18, that is, an opening through the body 14. The cooling opening 18 may be a single opening as in the example illustrated. As an alternative, however, the body 14 may define a plurality of cooling openings. Here, the cooling opening 18 is situated in the lower part of the front face 14a of the body 14. In the example illustrated, the cooling opening 18 is situated below the bumper 16. A grille 20 can be positioned in the cooling opening 18 to prevent projectiles from being able to pass through the cooling opening 18. A cooling module 22 is positioned facing the cooling opening 18. The grille 20 in particular provides protection for this cooling module 22.

Figure 2:
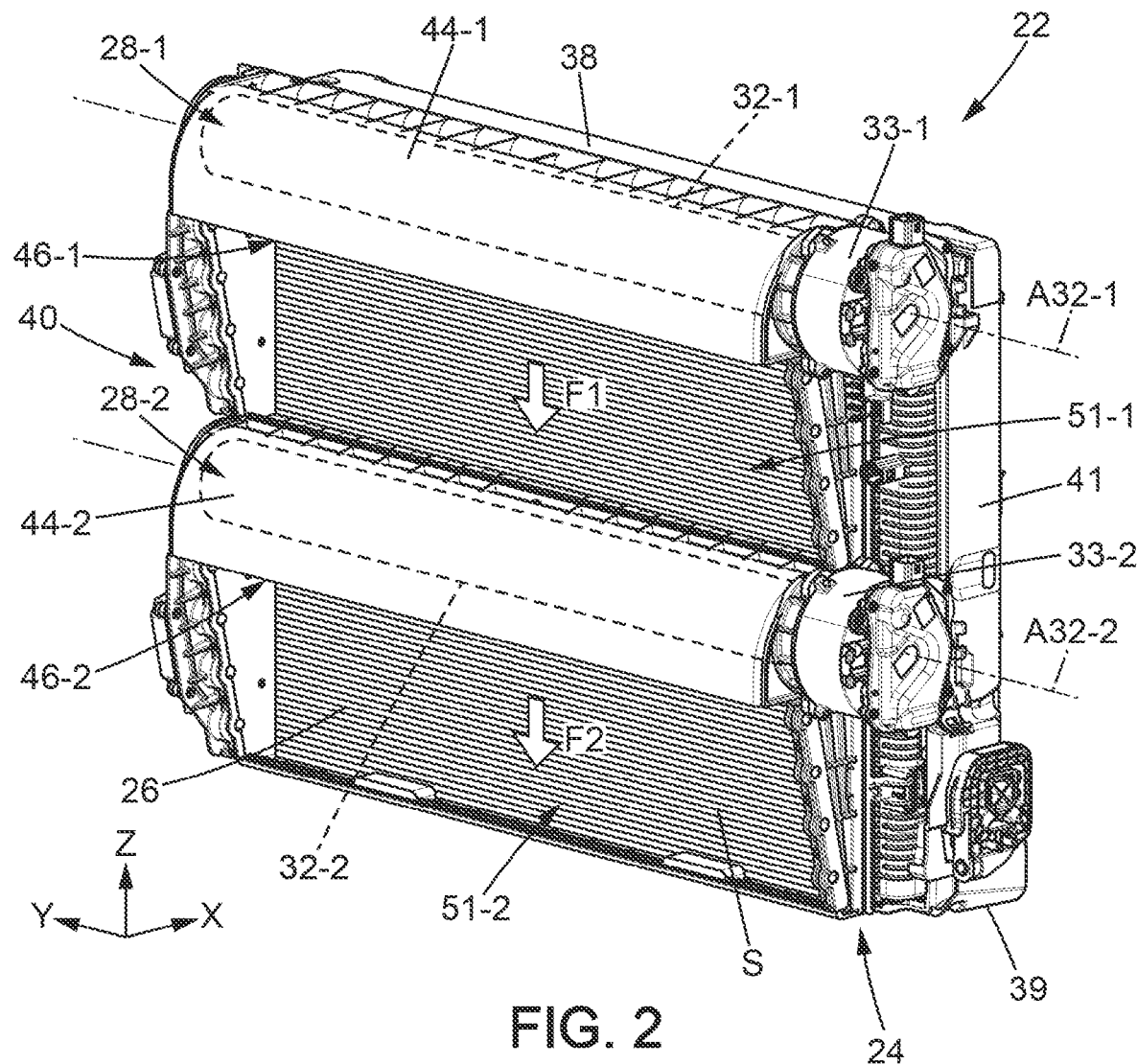
FIG. 2 is a schematic perspective view of a cooling module which may be used in the motor vehicle of FIG. 1, with the shutters having been removed.
Figure 3:
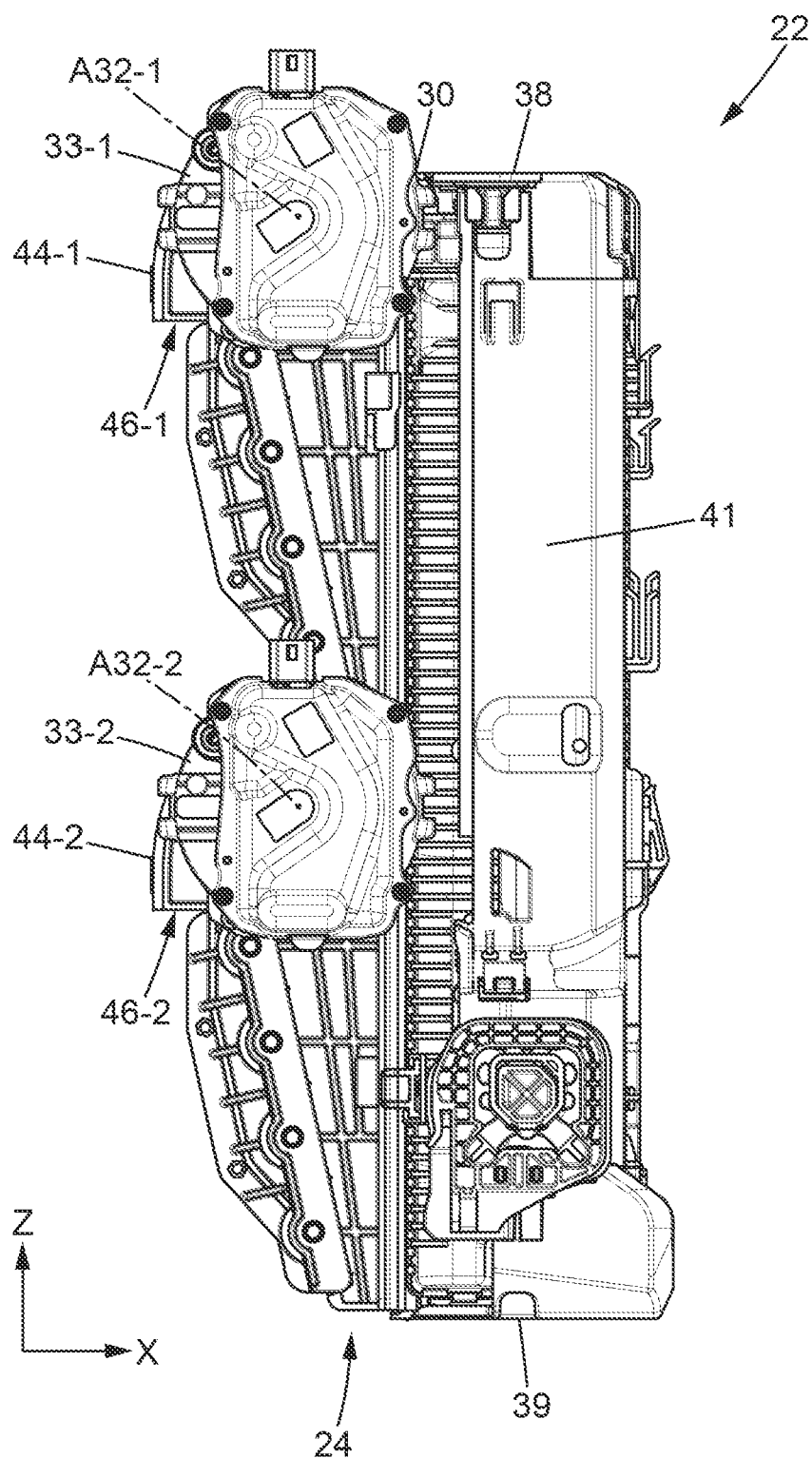
FIG. 3 is a side view of the module of FIG. 2.
Figure 4:
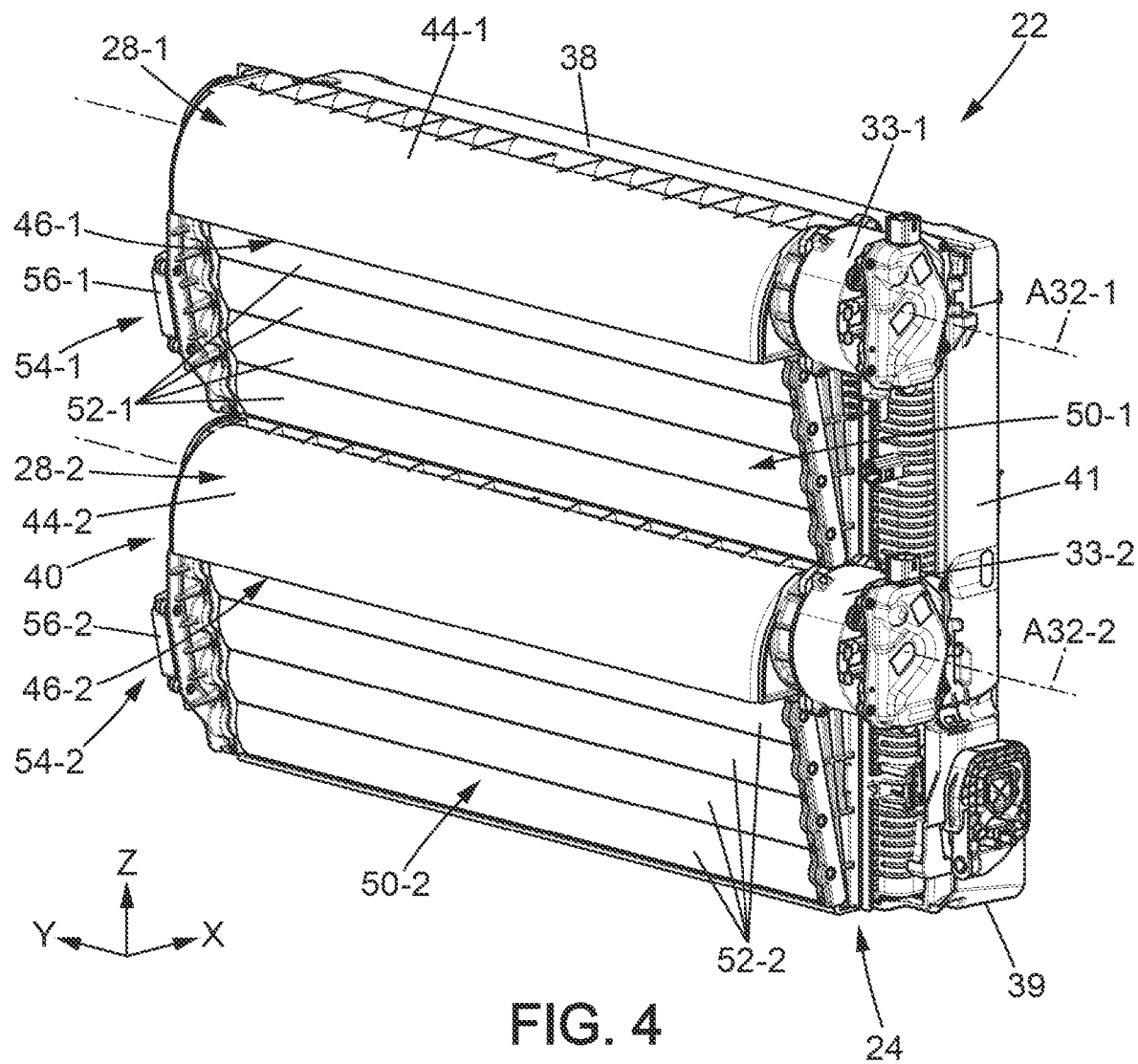
FIG. 4 is a view similar to FIG. 2, with the shutters in the position of closing an opening in the housing of the cooling module.

The cooling module 22 is more clearly visible in FIGS. 2 to 4.

The cooling module 22 comprises a ventilation device 24 associated with at least one heat exchanger 26.

As is evident from the figures, the ventilation device 24 comprises at least one tangential-flow fan, or, more generally, a tangential-flow turbomachine, which draws a flow of air into contact with the heat exchanger or heat exchangers 26. In the example illustrated, the cooling module 24 comprises two tangential-flow turbomachines 28-1, 28-2, described in detail below.

As illustrated, the cooling module 22 essentially includes a housing or frame 30 forming an internal air channel. The frame 30 is able to house at least one tangential-flow turbomachine. Here, a rear part of the frame 30 in particular forms the volute 30-1, 30-2 of a tangential-flow turbomachine 28-1, 28-28. The heat exchanger(s) 26 is (are) positioned in the internal air channel.

Each tangential-flow turbomachine 28-1, 28-2 comprises a rotor 32-1, 32-2. The rotor here consists of a turbine 32-1, 32-2, more specifically a tangential blower-wheel or bladed wheel. Each turbine 32-1, 32-2 has a cylindrical shape. Each turbine 32-1, 32-2 advantageously includes several stages of blades (or vanes). Each turbine 32-1, 32-2 is mounted so as to be able to rotate about an associated axis of rotation A32-1, A32-2. Each turbine 32-1, 32-2 is driven in its rotation by an associated motor 33-1, 33-2.

In FIG. 2, the collection of heat exchangers 26 define a surface S, referred to as the working surface, a cross section of which is substantially rectangular in a plane (Y, Z).

Preferably, the direction Y corresponds to a horizontal direction, more preferably still a transverse direction, while the direction Z corresponds to a vertical direction, when the module is installed in the motor vehicle.

The surface S is delimited by two opposite end edges 38, 39 extending in the direction Y, referred to as the length, and by another two opposite end edges 40, 41, in the direction Z, referred to as the height.

The surface S corresponds to the rectangle defined by the exchanger 26 or, if there are several exchangers present, by the largest heat exchanger. It is however also possible to juxtapose several exchangers vertically and/or horizontally, in which case the height of the surface S is the sum of the heights of the vertically juxtaposed (stacked) exchangers, and the length of the surface S is the sum of the lengths of the horizontally juxtaposed exchangers.

The first and second turbomachines 28-1 and 28-2 are mounted parallel to each other, which is to say that the air flow F1 ejected from the first turbine 32-1 of the first turbomachine 28-1 is distinct from the air flow F2 ejected from the second turbine 32-2 of the second turbomachine 28-2. In other words, the air flow F1 ejected from the first turbine 32-1 does not pass through the second turbine 32-2, and vice versa.

In the figures, the axes of rotation A32-1, A32-2 are parallel to the direction Y. The two turbines 32-1, 32-2 are thus mounted horizontally, in this instance in a transverse direction. Alternatively, the axes of rotation A32-1, A32-2 may be vertical, namely parallel to the axis Z.

As can also be seen in the figures, the volute 30-1 of the first turbomachine 28-1 comprises a first guiding portion 44-1 for guiding air around the first turbomachine 32-1 to a first air outlet 46-1 from the module 22. In a known manner, the first air guiding portion 44-1 advantageously comprises a wall in the shape of a truncated spiral.

Similarly, the volute 30-2 of the second turbomachine 28-2 comprises a second guiding portion 44-2 for guiding air around the second turbomachine 32-2 to an air outlet from the module 22, with reference sign 46-2. The second guiding portion 44-2 advantageously comprises a wall in the shape of a truncated spiral.

According to the embodiment illustrated, the two outlets 46-1, 46-2 are positioned facing each other, oriented in substantially the one same direction. This makes it possible to reduce the sound waves generated by the cooling module 22 in comparison with a configuration in which the two outlets face one another and are oriented in opposite directions.

The configuration illustrated ensures that the air distribution of a first air flow F1 originating from the first turbomachine 28-1 via the associated first outlet 46-1 is in substantially the same direction, and in particular in the same sense of the direction as the distribution of a second air flow F2 originating from the second turbomachine 28-2 via the associated second outlet 46-2. In this particular instance, the first and second air flows F1 and F2 are substantially vertical, and oriented downward.

Thus, when the vehicle is in a damp, or even wet, environment, such as during rain or when passing through a ford, the turbomachine 28-1, 28-2 is protected, as water cannot be stored in the volute 30-1, 30-2 but is instead discharged through the outlet 46-1, 46-2. As a result, any submersion of the cooling module 22 is prevented.

Advantageously, a grille (not depicted in the figures) is attached to each of the outlets 46-1, 46-2. Such a grille notably makes it possible to avoid any splashes entering the housing accommodating the turbine 32-1, 32-2 and damaging this turbine 32-1, 32-2.

As is also evident from the figures, the axis of rotation A32-1 of the first turbomachine 28-1 is positioned substantially facing the upper longitudinal edge 38 of the surface S and the axis of rotation A32-2 of the second turbomachine 28-2 is positioned at the mid-height of the surface S.

Nevertheless, depending on the configuration of the heat exchangers and/or the cooling power required for each exchanger, it is possible to position the turbomachines 28-1, 28-2 so that they are dedicated to respective exchangers 26. Other relative positions of turbomachines 28-1, 28-2 are also possible.

Advantageously, the axis of rotation A32-2 of the second turbomachine 28-2 is positioned in a zone between one fifth and four fifths of the height, preferably between one third and two thirds of said height, of the working surface S.

As illustrated in FIGS. 3 and 4, the module 22 is provided with air guiding means 50-1, 50-2 associated with each turbomachine 28-1, 28-2 (these means have been removed from FIG. 2 in order to render the exchanger 26 visible).

Each air guiding means 50-1, 50-2 comprises a plurality of shutters 52-1, 52-2. Each plurality of shutters 52-1, 52-2 is mounted with the ability to pivot between a closed position, illustrated in FIG. 4, in which the shutters 52-1, 52-2 block off a respective opening 51-1, 51-2 formed by the frame 30 of the cooling module 22, and at least one open position, in which the shutters 52-1, 52-2 allow at least part of the air flow to pass through the associated opening 51-1, 51-2. When the shutters 52-1, 52-2 are in the closed position, they allow the air flow created to be directed toward the associated turbomachine 28-1, 28-2. By contrast, when the shutters 52-1, 52-2, are in an open position, generally attained when the associated turbomachine 28-1, 28-2 is switched off, at least part of the air flow created, for example, by the speed of the vehicle on which the cooling module 22 is mounted, is able to be directed through a respective opening 51-1, 51-2 in the frame 30, without passing via the associated turbomachine 28-1, 28-2. The air flow is thus "diverted" to "bypass" the turbomachine 28-1, 28-2.

The open position is particularly advantageous when the vehicle is traveling at high speed, in which case the turbomachines 28-1, 28-2 can be switched off.

The number of shutters 52-1 associated with the first turbomachine 28-1 can be identical to or, conversely, different from, the number of shutters 52-2 associated with the second turbomachine 28-2, depending in particular on the respective position of the turbomachines 28-1, 28-2.

Each plurality of shutters 52-1, 52-2 is associated with a respective actuator 54-1, 54-2. One actuator 54-1 is described in greater detail hereinafter, with reference to FIGS. 5 and 6, on the understanding that the actuator 54-2 may be identical.

Figure 5:
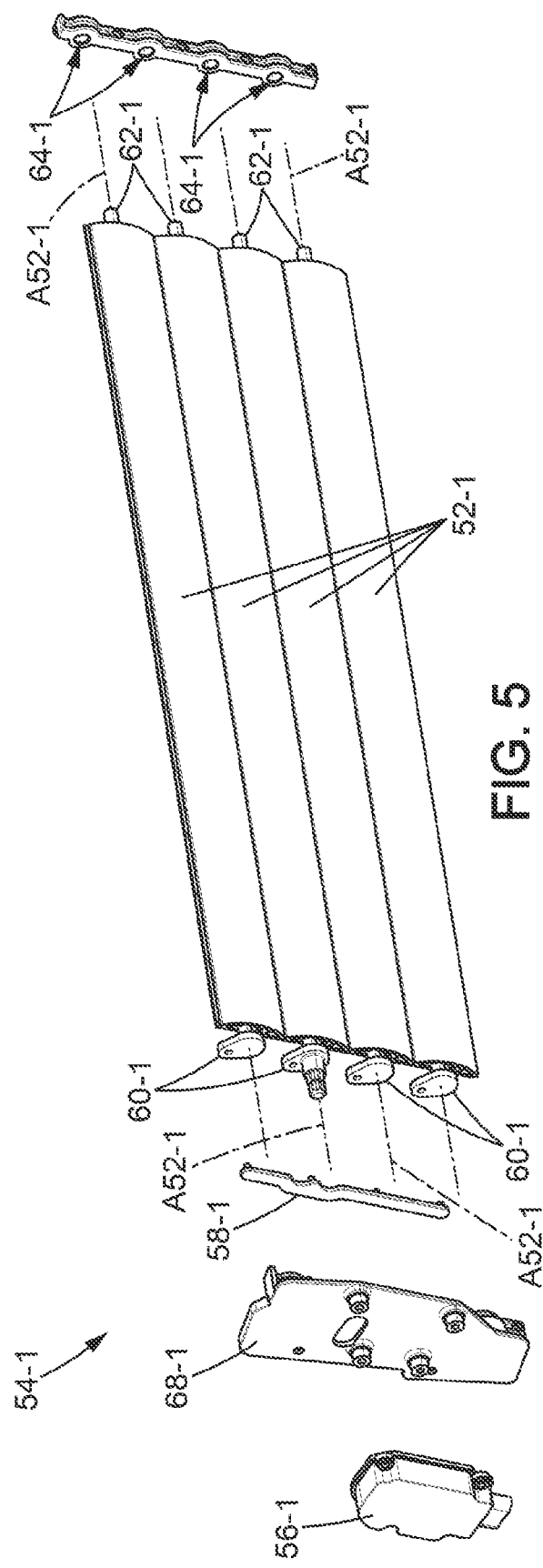
FIG. 5 is an exploded view of a detail of the cooling module of FIGS. 2 to 4.
Figure 6:
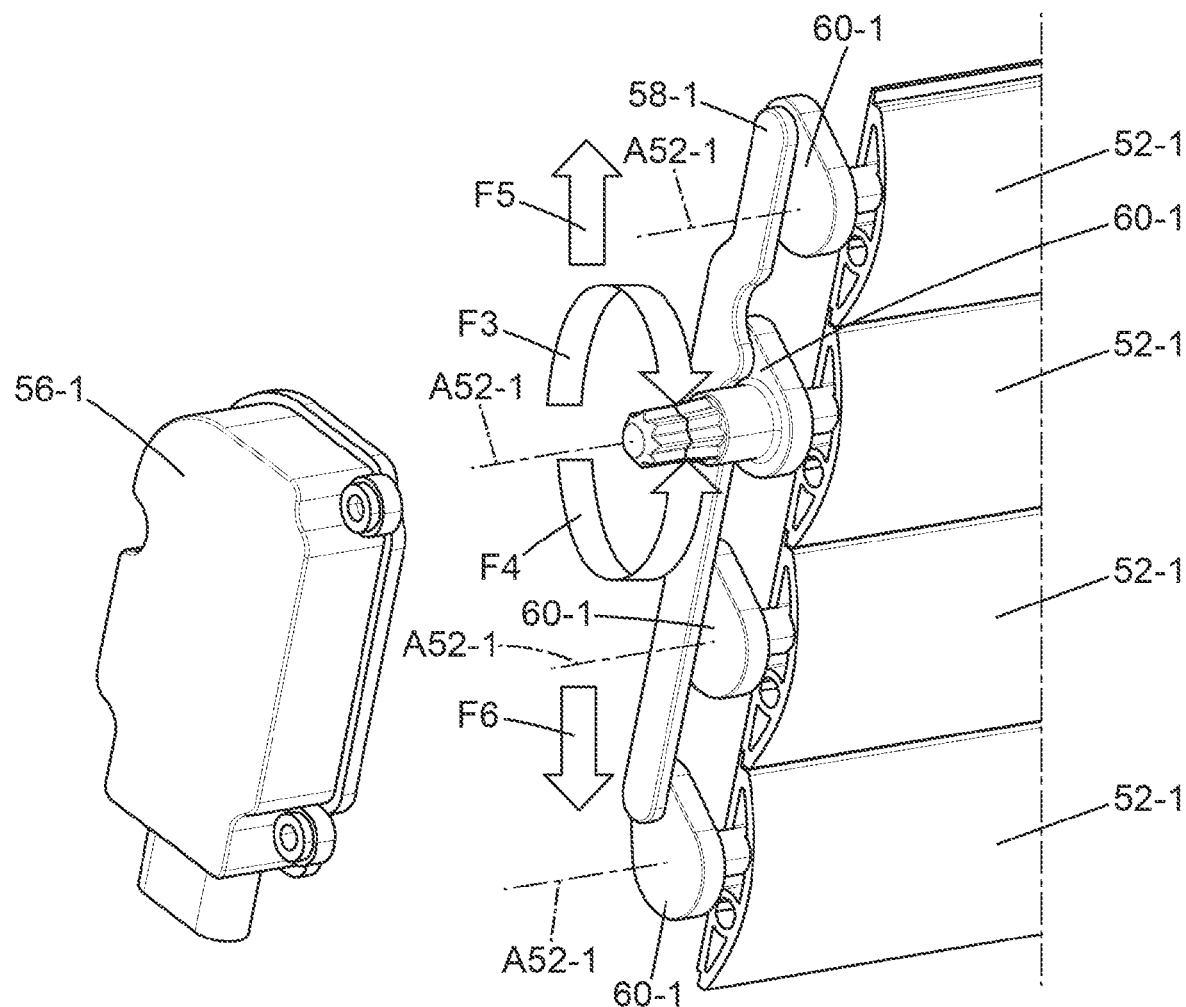
FIG. 6 is an exploded view of another detail of the cooling module of FIGS. 2 to 4.

As illustrated in FIGS. 5 and 6, the actuator 54-1 first of all comprises an electric motor 56-1 of which the output shaft drives the rotation of a first shutter 52-1. The actuator 54-1 also comprises a connecting rod 58-1, the connecting rod 58-1 connecting the first shutter 52-1, rotationally driven by the output shaft of the electric motor 56-1, to the other shutters 52-2 of the plurality of shutters 52-1, so that the rotation of the first shutter 52-1 is transmitted to the other shutters 52-1 of the plurality of shutters 52-1.

More specifically, each shutter 52-1 comprises, at a first end, a cam 60-1. The axis of each cam 60-1 corresponds to the axis A52-1 of rotation of the associated shutter 52-1. The cams 60-1 associated with the various shutters 52-1 are connected to one another by the connecting rod 58-1 For example, the connecting rod 58-1 comprises a stud associated with each cam 60-1 and housed in a complementing housing formed in the cam 60-1 so that the stud received in the housing is able to pivot with respect to the cam 60-1. The cam 60-1 associated with the first shutter 52-1 is rotationally driven by the output shaft of the electric motor 56-1, either directly, or via a reduction gearing. The point of attachment of the connecting rod 58-1 to each cam 60-1 is offset from the axis A52-1 of rotation of the associated shutter 52-1.

As visible particularly in FIG. 5, the opposite end of each shutter 52-1 from the cam 60-1 here has a spigot 62-1 housed in a complementing housing 64-1 formed on a first upright 66-1 of the actuator 54-1. The first upright 66-1 may be formed in full or in part by the housing 30 of the cooling module 22. The spigot 62-1 and the complementing housing 64-1 are, for example, cylindrical, of circular cross section.

The cams 60-1 are also housed in complementing housings, to guide their rotation about the axis A52-1 of rotation of the associated shutter 52-1. The housings are formed in a second upright 68-1. The second upright 68-1 may be formed in full or in part by the housing 30 of the cooling module 22.

As illustrated schematically in FIG. 6, the first shutter 52-1 is made to rotate F3, F4 about its axis of rotation A52-1 depending on the direction of rotation of the motor 56-1. The rotation F3, F4 of this first shutter 52-1 causes the associated cam 60-1 to rotate and this cam in turn causes the connecting rod 58-1 to move F5, F6, in this instance vertically. The movement F5, F6 of the connecting rod 58-1 causes the other cams 60-1 and, consequently, the other shutters 52-1 of the plurality of shutters 52-1, to rotate.

In order to improve the sealing between the shutters 52-1 when in the closed position, a seal—not illustrated in the figures—may be overmolded onto the shutters. Alternatively or in addition, each shutter 52-1 has a rib 70-1 along a first longitudinal side and a groove 72-1 of a shape that complements the rib 70-1, along a second longitudinal side, so that the rib 70-1 of a first shutter 52-1 is housed in the groove 72-1 of an adjacent second shutter 52-1 when the shutters 52-1 are in the closed position.

Figure 8:
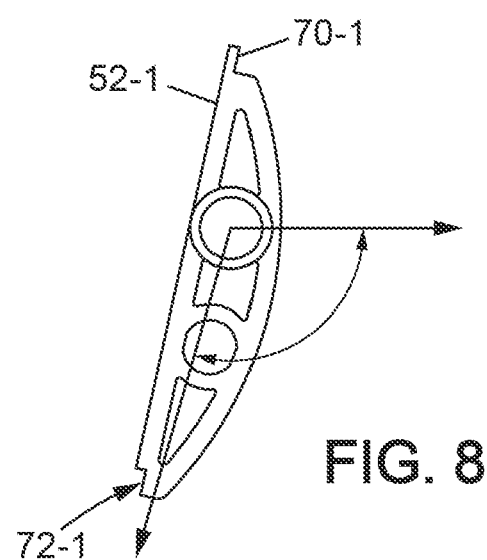
FIG. 8 is a view in section of a shutter of the cooling module of FIGS. 2 to 4.

As illustrated particularly in FIG. 8, each shutter 52-1 may be tubular. As a preference, that face of a shutter 52-1 that is intended to face toward the heat exchanger(s) 26 is substantially planar. The planar faces of the shutters 52-1 are aligned when the shutters 52-1 are in the closed position, to form a substantially planar surface for guiding the flow of air. This makes it possible to limit pressure drops in the air flow. The opposite face of the shutters 52-1 is preferably curved.

Figure 7:
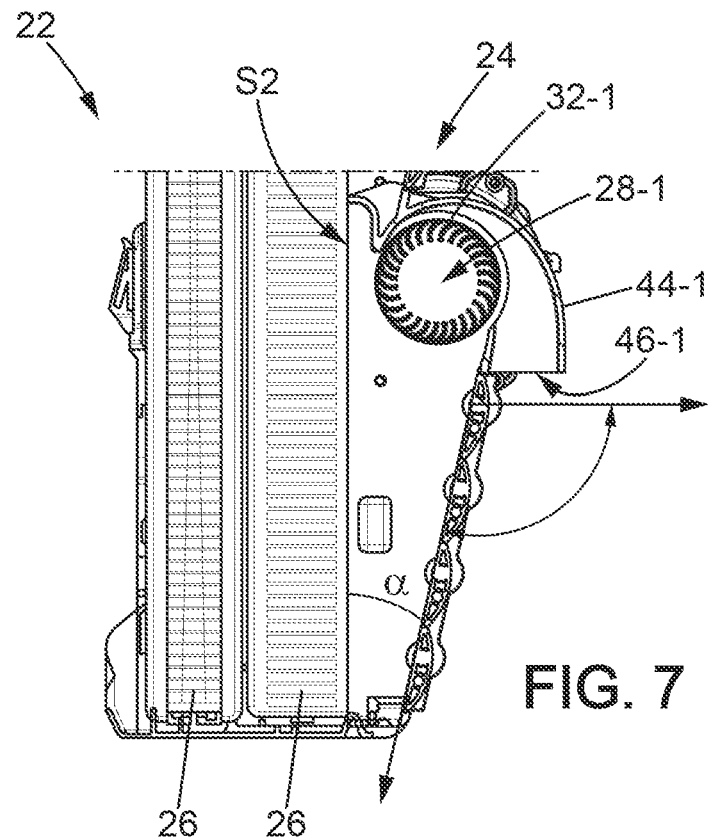
FIG. 7 is a view in longitudinal section of part of the cooling module of FIGS. 2 to 4.

Furthermore, FIGS. 7 and 8 also illustrate that each shutter 52-1, 52-2 can be pivoted through an angular range of amplitude of between 90° and 110°, preferably of amplitude equal to 102.5°. One of the two extreme positions of the shutters 52-1 here corresponds to the closed position of the shutters 52-1, in which position the planar faces of the aligned shutters 52-1 form an angle $\alpha$ of between 5° and 20°, preferably substantially equal to 12.5°, with an air inlet surface S2 normal to the air flow entering the ventilation device 24. The other of the two extreme positions of the shutters 52-1 corresponds to a position of the shutters 52-1 in which the planar surfaces of the shutters 52-1 extend substantially horizontally, which is to say substantially parallel to the flow of air entering the ventilation device 24. This position minimizes the resistance of the shutters 52-1, 52-2 to the flow of air passing through the associated opening 51-1, 51-2.

The invention is not restricted to the example described hereinabove alone. Rather, the invention can be the subject of numerous variants accessible to those skilled in the art.

In particular, in the example illustrated, the ventilation device comprises two turbomachines. Alternatively, the ventilation device may comprise a single turbomachine or more than two turbomachines.

Also, in the example illustrated, the shutters pivot about an axis parallel to the axis of rotation of the turbomachines. Alternatively, however, the shutter or shutters may pivot about an axis perpendicular to the axis of rotation of the turbomachine(s).

The invention claimed is:

1. A ventilation device for a cooling module for a motor vehicle, comprising:
    at least one tangential-flow turbomachine comprising a bladed wheel and a motor for driving the rotation of the bladed wheel;
    wherein the cooling module is disposed at a front face of the motor vehicle;
    at least one frame forming a receiving housing able to accommodate the bladed wheel;
    a plurality of shutters mounted with the ability to pivot with respect to the frame, the plurality of shutters being configured to selectively block off an opening through the frame; and
    an actuator to bring about the pivoting of the plurality of shutters, said actuator comprising:
        an electric motor of which an output shaft drives the rotation of one of the plurality of shutters;
        at least one connecting rod connecting said one shutter to the other shutter(s) of the plurality of shutters, so that the rotation of said one shutter is transmitted to the other shutter(s),
    wherein, in a position in which the opening is blocked off by the shutters, the shutters form a substantially planar surface which, with an air inlet surface normal to the air flow entering the ventilation device, forms an angle of between 5 and 20°.

2. The ventilation device as claimed in claim 1, wherein each shutter has, at a first end, a cam, the cams of the shutters being connected to one another by said at least one connecting rod.

3. The ventilation device as claimed in claim 2, wherein each shutter has, at a second end, a spigot housed with the ability to pivot in a receiving housing in the frame.

4. The ventilation device as claimed in claim 1, wherein the shutters are tubular, the shutters having a substantially planar face and a curved opposite face, the substantially planar faces of the shutters being intended to be aligned in the position in which the shutters block off the opening through the frame.

5. The ventilation device as claimed in claim 4, wherein the shutters have a longitudinal rib on a first longitudinal side and a longitudinal groove on a second longitudinal side, the groove and the rib having complementing shapes.

6. The ventilation device as claimed in claim 1, wherein the shutters are configured to be able to pivot through an angular range of amplitude of between 90° and 110°.

7. The ventilation device as claimed in claim 1, further comprising a grille at an air outlet formed by the frame.

8. A cooling module for a motor vehicle with an electric motor, comprising: at least one heat exchanger and at least one ventilation device as claimed in claim 1 and able to create a flow of air in contact with the at least one heat exchanger.

9. The ventilation device of claim 1,
    wherein the at least one tangential-flow turbomachine comprises a first tangential-flow turbomachine coupled parallel to a second tangential-flow turbomachine in a same direction, the second tangential-flow turbomachine comprising a second bladed wheel and a second motor for driving the rotation of the second bladed wheel.

10. The ventilation device of claim 9, further comprising:
    a first air flow ejected from the first tangential-flow turbomachine; and
    a second air flow ejected from the second tangential-flow turbomachine,
    wherein the first air flow and the second air flow are substantially vertical and oriented downward so that the first tangential-flow turbomachine and the second tangential-flow turbomachine are protected from an environment around the vehicle.

* * * * *